United States Patent
Nakanishi et al.

(10) Patent No.: US 8,770,025 B2
(45) Date of Patent: Jul. 8, 2014

(54) PHYSICAL QUANTITY SENSOR

(75) Inventors: Tsutomu Nakanishi, Osaka (JP); Yasunobu Kobayashi, Fukui (JP); Koumei Hujita, Osaka (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 13/321,980

(22) PCT Filed: May 26, 2010

(86) PCT No.: PCT/JP2010/003507
§ 371 (c)(1),
(2), (4) Date: Nov. 22, 2011

(87) PCT Pub. No.: WO2010/137303
PCT Pub. Date: Dec. 2, 2010

(65) Prior Publication Data
US 2012/0067125 A1 Mar. 22, 2012

(30) Foreign Application Priority Data
May 27, 2009 (JP) .................................. 2009-127351

(51) Int. Cl.
*G01H 13/00* (2006.01)
*G01P 15/09* (2006.01)

(52) U.S. Cl.
USPC ........................................ 73/579; 73/514.34

(58) Field of Classification Search
USPC ............ 73/579, 1.15, 504.12, 504.18, 514.34
See application file for complete search history.

(56) References Cited

U.S. PATENT DOCUMENTS

| | | | |
|---|---|---|---|
| 4,107,626 A | 8/1978 | Kiewit | |
| 5,020,370 A | 6/1991 | Deval et al. | |
| 5,629,483 A * | 5/1997 | Nakamura et al. | 73/514.34 |
| 5,679,896 A | 10/1997 | Nakamura et al. | |
| 5,696,322 A * | 12/1997 | Mori et al. | 73/504.12 |
| 5,922,954 A * | 7/1999 | Ebara et al. | 73/504.12 |
| 5,970,792 A * | 10/1999 | Yamamoto | 73/504.14 |
| 6,016,698 A * | 1/2000 | Kasanami et al. | 73/504.14 |

(Continued)

FOREIGN PATENT DOCUMENTS

| | | |
|---|---|---|
| CN | 1480710 A | 3/2004 |
| CN | 1595172 A | 3/2005 |

(Continued)

OTHER PUBLICATIONS

International Application Serial No. PCT/JP2010/003507, International Search Report mailed Aug. 10, 2010, 2 pgs.

*Primary Examiner* — J M Saint Surin
(74) *Attorney, Agent, or Firm* — RatnerPrestia

(57) ABSTRACT

A physical quantity sensor includes a beam-like vibrating body and a fixing part supporting both ends of the beam-like vibrating body. A driving element is formed on a central portion of the beam-like vibrating body, and feedback elements are formed on both ends. A physical quantity acting on the beam-like vibrating body is detected by causing natural vibration in the beam-like vibrating body and detecting a natural frequency of the vibrating body. This enables reliable detection of a physical quantity, such as a strain or load, acting on an object.

15 Claims, 7 Drawing Sheets

(56) References Cited

U.S. PATENT DOCUMENTS

| | | | |
|---|---|---|---|
| 6,016,699 A * | 1/2000 | Kasanami et al. | 73/504.14 |
| 6,158,281 A * | 12/2000 | Ebara et al. | 73/504.12 |
| 6,161,432 A * | 12/2000 | Kasanami et al. | 73/504.14 |
| 7,109,636 B2 * | 9/2006 | Yamashita | 310/316.01 |
| 2004/0007065 A1 | 1/2004 | Fujimoto et al. | |
| 2004/0250621 A1 | 12/2004 | Fujimoto et al. | |
| 2005/0052096 A1 | 3/2005 | Yamashita | |
| 2005/0150298 A1 | 7/2005 | Fujimoto et al. | |
| 2008/0197752 A1 | 8/2008 | Watanabe | |

FOREIGN PATENT DOCUMENTS

| | | |
|---|---|---|
| JP | 53-81281 | 7/1978 |
| JP | 61-10197 | 4/1986 |
| JP | 02-189433 | 7/1990 |
| JP | 03-103735 | 4/1991 |
| JP | 06-011400 | 1/1994 |
| JP | 06-249874 | 9/1994 |
| JP | 08-122172 | 5/1996 |
| JP | 2008-197030 | 8/2008 |

* cited by examiner

PHYSICAL QUANTITY SENSOR

This application is a U.S. National phase application of PCT international application PCT/JP2010/003507.

TECHNICAL FIELD

The present invention relates to physical quantity sensors that detect strains and loads acting on objects.

BACKGROUND ART

FIGS. 5A to 5C show one known physical quantity sensor that detects strains and loads acting on objects (see PTL 1). FIGS. 5A and 5B are a top view and a side view of a conventional physical quantity sensor. In FIGS. 5A and 5B, flexure element 1 is configured with a highly elastic metal material. Hole 2 is punched to form thin stress-concentrating portions 3a to 3d. Notched elongate holes 6a, 6b, 7a, and 7b are provided on stress-concentrating portions 3a and 3b at the top face side of this flexure element 1. These notched elongate holes 6a, 6b, 7a, and 7b are provided along a longer direction connecting fixed end 4 and movable end 5 of flexure element 1, and are connected to hole 2. Notched portions 9 and 10 are formed on the rear face of central beam 8a between notched elongate holes 6a and 7a, and on the rear face of central beam 8b between notched elongate holes 6b and 7b. First piezoelectric element 11 for driving and second piezoelectric element 12 for feedback are bonded at the ends of beam 8b of stress-concentrating portion 3b.

FIG. 5C is a side view of an essential part where oscillator 13 is connected to portion A in FIG. 5B. As shown in FIG. 5C, first piezoelectric element 11 is connected to an output side of oscillator 13, and second piezoelectric element 12 is connected to an input side of oscillator 13. Resonance frequencies of first and second piezoelectric elements 11 and 12 are selected close to natural frequency $f_e$ of beam 8b.

In the above configuration, when oscillator 13 applies AC voltage with a frequency close to natural frequency $f_e$ of beam 8b to first piezoelectric element 11, first piezoelectric element 11 provided at one end of beam 8b generates mechanical vibration. This mechanical vibration causes beam 8b to start vertical string vibration at its natural frequency $f_e$. Second piezoelectric element 12 receives this string vibration, and this second piezoelectric element 12 feeds back an AC signal with a frequency equivalent to natural frequency $f_e$ of beam 8b to the input side of oscillator 13. This allows beam 8b to retain string vibration at the frequency equivalent to its natural frequency $f_e$.

If load F acting on movable end 5 of flexure element 1 increases in this state, in which beam 8b is undergoing vertical string vibration, the tensile force on beam 8b increases. This increases natural frequency $f_e$ of beam 8b. Conversely, if load F acting on movable end 5 of flexure element 1 decreases, the tensile force on beam 8b decreases. This decreases natural frequency $f_e$ of beam 8b. Accordingly, a strain or load F acting on movable end 5 of flexure element 1 can be measured by measuring natural frequency $f_e$ output to a terminal.

Advances in microfabrication technology, such as MEMS (Micro Electro Mechanical System) technology, have enabled the creation of extremely small and thin mechanical oscillators. This technology allows configuration of an oscillator itself with small mass, and therefore high-precision oscillators in which frequency or impedance fluctuate widely, in spite of a small load being applied, can be manufactured. By employing this type of micro-mechanical oscillator, a physical quantity sensor that can measure a load or strain acting on the flexure element can be configured just by bonding the physical quantity sensor to the flexure element, without providing a stress-concentrating point on the flexure element itself.

FIGS. 6A to 6C show the conventional physical quantity sensor that inventors of the present invention have created employing an oscillator adopting this MEMS technology. FIG. 6A is a top view of the conventional physical quantity sensor, FIG. 6B is a sectional view taken along line 6B-6B in FIG. 6A, and FIG. 6C is a sectional view taken along line 6C-6C in FIG. 6A. In these FIGS. 6A to 6C, an insulating layer (not illustrated) typically made of an oxide silicon layer or a silicon nitride layer is formed on the surface of semiconductor substrate 101. Beam 102 is formed by etching semiconductor substrate 101. Fixed portion 103 surrounds beam 102. Driving element 104 is formed on a central portion of the surface of beam 102. Driving element 104 includes a lower electrode (not illustrated), a piezoelectric layer (not illustrated) typically made of PZT, and an upper electrode (not illustrated) in this sequence from the bottom. Furthermore, feedback element 105 is formed at an end of beam 102. Feedback element 105 includes a lower electrode (not illustrated), a piezoelectric layer (not illustrated) formed of PZT, and an upper electrode (not illustrated) in this sequence from the bottom. Driving element 104 and feedback element 105 are electrically connected to land 106 by a wiring pattern (not illustrated). The oscillator is connected and fixed by rigid substance 108, such as a metal bonding material for Au—Au bonding and epoxy resin, onto fixed portions 103 at both ends of beam 102 so that a strain generated in flexure element 107 is transmitted to the oscillator.

Driving element 104 is connected to the output side of an amplifier (not illustrated), and feedback element 105 is connected to the input side of the amplifier via a phase shifter (not illustrated). Resonance frequencies of driving element 104 and feedback element 105 are selected close to natural frequency $f_e$ of beam 102.

In the above configuration, when the amplifier applies AC voltage with a frequency close to natural frequency $f_e$ of beam 102 to driving element 104, driving element 104 generates mechanical vibration. This mechanical vibration makes beam 102 start vertical string vibration at natural frequency $f_e$. Feedback element 105 receives this string vibration, and feeds back an AC signal with frequency equivalent to natural frequency $f_e$ of beam 102 to the input side of the amplifier via the phase shifter. Accordingly, beam 102 retains the string vibration at a frequency equivalent to its natural frequency $f_e$.

If load f acting on flexure element 107 increases in this state in which beam 102 is undergoing vertical string vibration, the tensile force on beam 102 increases. Natural frequency $f_e$ of beam 102 therefore increases. Conversely, if load f acting on flexure element 107 decreases, the tensile force on beam 102 decreases, and natural frequency $f_e$ of beam 102 therefore decreases. In this way, a strain or load f acting on flexure element 107 can be measured by measuring natural frequency $f_e$ output to the terminal.

However, in the conventional physical quantity sensor in FIGS. 5A to 5C, beam 8b tends to generate a higher-order resonance mode, such as 3rd harmonic and 5th harmonic resonance modes, since first piezoelectric element 11 for driving is attached to the end of beam 8b. This higher-order resonance mode has a low Q factor, which shows sharpness of resonance, compared to the fundamental vibration mode that is the lowest mode of vibration in which the center of beam 8b is an antinode and both ends are nodes. Coupling of higher-order modes is also likely to occur. The vibration frequency of beam 8b may thus change significantly if the ambient temperature or power voltage applied to oscillator 13 changes. In some cases, this causes a failure to accurately measure a strain or load F acting on movable end 5 of flexure element 1.

On the other hand, in the conventional physical quantity sensor shown in FIGS. 6A to 6C, driving element 104 is formed at the center of beam 102. The fundamental vibration mode is therefore generated in beam 102. However, feedback element 105 is formed only on one end of beam 102. This makes the vibration mode asymmetric relative to the center of beam 102, due to the difference in rigidity between feedback element 105 and beam 102 or the mass of feedback element 105. FIG. 7 illustrates the results of simulating the distribution of vibration displacement when driving element 104 that is 3 μm thick and 0.45 mm long, and feedback element 105 that is 3 μm thick and 0.2 mm long, are formed on beam 102 that is 10 μm thick and 1.2 mm long. As shown in FIG. 7, the fundamental vibration mode is generated in beam 102, in which the center is the antinode and both ends are nodes. However, the maximum amplitude is shifted to the left from the center of beam 102. This asymmetry mode has a low Q factor, which shows sharpness of resonance, compared to the symmetric mode. This reduces amplitude in feedback element 105, thus reducing the accuracy of vibration frequency. The output charge generated in feedback element 105 is also reduced. Accordingly, the measurement accuracy of a strain or load f acting on flexure element 107 may degrade.

CITATION LIST

Patent Literature

PTL 1 Japanese Patent Unexamined Publication No. H3-103735

SUMMARY OF THE INVENTION

A physical quantity sensor of the present invention includes a beam-like vibrating body and a fixing part that supports both ends of this vibrating body. A first piezoelectric element is formed on a central portion of the vibrating body, and a second piezoelectric element and third piezoelectric element are formed on both ends of the vibrating body. The first piezoelectric element acts as a driving element, and the second piezoelectric element and the third piezoelectric element act as feedback elements, so as to cause the beam-like vibrating body to generate natural vibration. A physical quantity acting on the beam-like vibrating body is detected by measuring a natural frequency of the vibrating body. This configuration enables the generation of a fundamental vibration mode in which vibration displacement is distributed symmetrically to the center of the beam-like vibrating body. Accordingly, the present invention offers an effect that a physical quantity, such as a strain or load, acting on an object can be reliably detected.

Another physical quantity sensor of the present invention includes a beam-like vibrating body, and a fixing part supporting both ends of this vibrating body. A first piezoelectric element is formed on the central portion of the vibrating body. A second piezoelectric element and a third piezoelectric element are formed on both ends of the beam-like vibrating body. The first piezoelectric element formed on the central portion of the beam-like vibrating body acts as a feedback element, and second and third piezoelectric elements formed on both ends of the beam-like vibrating body act as driving elements. The second piezoelectric element and the third piezoelectric element are configured to be driven with the same amplitude in the same phase. This configuration enables generation of the fundamental vibration mode in which vibration displacement is distributed symmetrically to the center of the beam-like vibrating body. In addition, the feedback element is disposed at a position where the vibration amplitude is the highest, that is, in the center of the beam-like vibrating body. A higher output voltage can thus be obtained from the feedback element. Accordingly, the present invention offers an effect that a physical quantity, such as a strain or load, acting on an object can be reliably detected.

Still another physical quantity sensor of the present invention includes a beam-like vibrating body and a fixing part supporting both ends of this vibrating body. A first piezoelectric element is formed on a central portion of the vibrating body. A second piezoelectric element and a third piezoelectric element are formed on both ends of the vibrating body. The first piezoelectric element formed on the central portion of the vibrating body acts as a detecting element. The second and the third piezoelectric elements formed on both ends of the beam-like vibrating body act as driving elements. The fourth and fifth piezoelectric elements are further formed near the second and third piezoelectric elements as feedback elements. The vibrating body generates natural vibration by driving the second piezoelectric element and the third piezoelectric element with the same amplitude in the same phase. The feedback elements measure a natural frequency of the beam-like vibrating body. This configuration reliably generates the fundamental vibration mode, in which vibration displacement is distributed symmetrically to the center of the beam-like vibrating body, by detecting the vibration state of the beam-like vibrating body near the driving element using the feedback elements. In addition, since the detecting element is disposed at a position where the vibration amplitude is the highest, that is, in the center of the beam-like vibrating body, a higher output voltage can thus be obtained from the detecting element. Accordingly, the present invention offers an effect that a physical quantity, such as a strain or load, acting on an object can be further reliably detected.

DESCRIPTION OF EMBODIMENTS

First Exemplary Embodiment

Figure 1A:
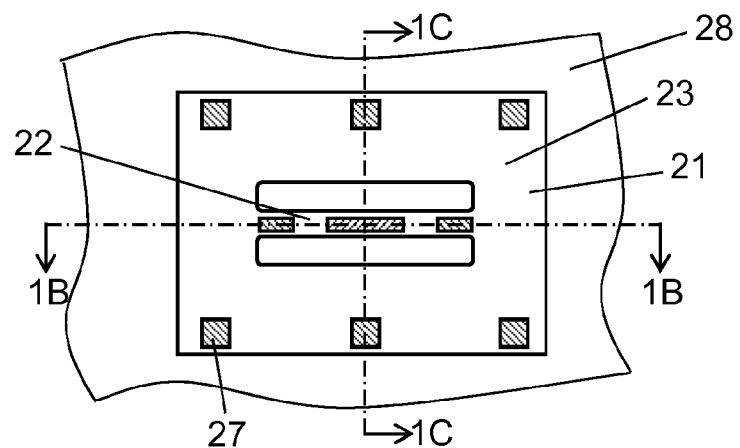
FIG. 1A is a top view of a physical quantity sensor in accordance with a first exemplary embodiment of the present invention.
Figure 1B:
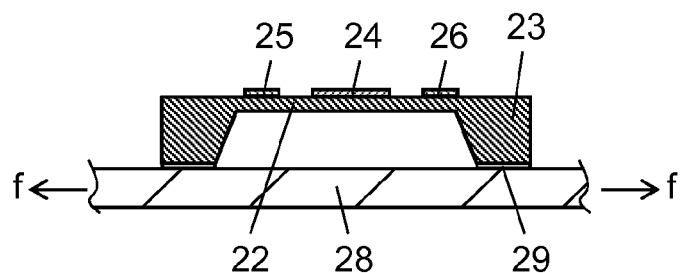
FIG. 1B is a sectional view taken along line 1B-1B in FIG. 1A.
Figure 1C:
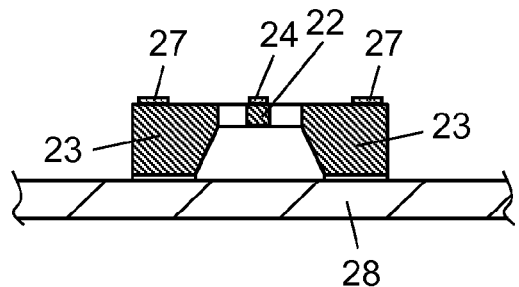
FIG. 1C is a sectional view taken along line 1C-1C in FIG. 1A.
Figure 1D:
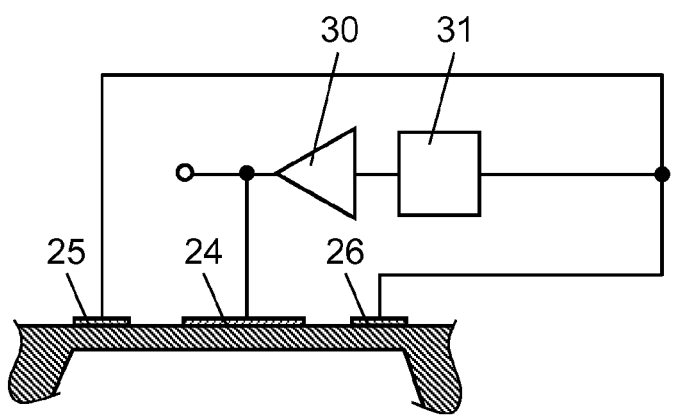
FIG. 1D illustrates an amplifier and a gain adjustment and phase shifting unit connected to the physical quantity sensor in FIG. 1B.

FIG. 1A is a top view of a physical quantity sensor in the first exemplary embodiment of the present invention. FIG. 1B is a sectional view taken along line 1B-1B in FIG. 1A. FIG. 1C is a sectional view taken along line 1C-1C in FIG. 1A. FIG. 1D illustrates an amplifier and a gain adjustment and phase shifting unit connected to the physical quantity sensor in FIG. 1B. In FIGS. 1A to 1D, semiconductor substrate 21 is typically made of silicon, and an insulating layer (not illustrated) of an oxide silicon layer or a silicon nitride layer is formed on its surface. Beam 22 is formed by etching semiconductor substrate 21. Beam 22 configures a beam-like vibrating body that changes its natural frequency by the action of physical quantity. Fixing part 23 surrounds beam 22, and supports both ends of the beam-like vibrating body. Driving element 24 (first piezoelectric element) is formed on a central portion of the surface of beam 22. Driving element 24 includes a lower electrode (not illustrated), a piezoelectric layer (not illustrated) typically made of PZT, and an upper electrode (not illustrated) in this sequence from the bottom. Feedback elements 25 and 26 (second and third piezoelectric elements) are formed on both ends of beam 22 at symmetrical positions relative to the center of beam 22. Each of feedback elements 25 and 26 includes a lower electrode (not illustrated), a piezoelectric layer (not illustrated) typically made of PZT, and an upper electrode (not illustrated) in this sequence from the bottom. Driving element 24 and feedback elements 25 and 26 are electrically connected to land 27 by a wiring pattern (not illustrated). This physical quantity sensor is connected and fixed by fixing part 23 at both ends using rigid substance 29, such as a metal bonding material for Au—Au bonding and epoxy resin, so as to transmit a strain generated in flexure element 28 configuring an object to an oscillator.

In FIG. 1D, driving element 24 is connected to an output side of amplifier 30. Feedback elements 25 and 26 are connected to an input side of amplifier 30 via gain adjustment and phase shifting unit 31. Resonance frequencies of driving element 24 and feedback elements 25 and 26 are selected close to natural frequency $f_e$ of beam 22.

In the above configuration, when amplifier 30 applies AC voltage with a frequency close to natural frequency $f_e$ of beam 22 to driving element 24, driving element 24 provided at the center of beam 22 starts stretching vibration in a direction parallel to a longer direction of beam 22. This stretching vibration causes beam 22 to start vertical string vibration at natural frequency $f_e$. Feedback elements 25 and 26 receive this string vibration, and generates AC signals with a frequency equivalent to natural frequency $f_e$ of beam 22. Gain adjustment and phase shifting unit 31 adjusts phases of these AC signals, and then signals are fed back to the input side of amplifier 30. Accordingly, beam 22 retains string vibration at a frequency equivalent to its natural frequency $f_e$. Here, the AC signals from feedback elements 25 and 26 may be added in an adder, and then fed back to the input side of amplifier 30 via gain adjustment and phase shifting unit 31.

In this state in which beam 22 is undergoing vertical string vibration, the tensile force on beam 22 increases if load f acting on flexure element 28 increases. Natural frequency $f_e$ of beam 22 therefore increases. Conversely, if load f acting on flexure element 28 decreases, the tensile force on beam 22 decreases, and natural frequency $f_e$ of beam 22 therefore decreases. Accordingly, a strain or load f acting on flexure element 28 can be measured by measuring natural frequency $f_e$ output to a terminal.

Figure 2:
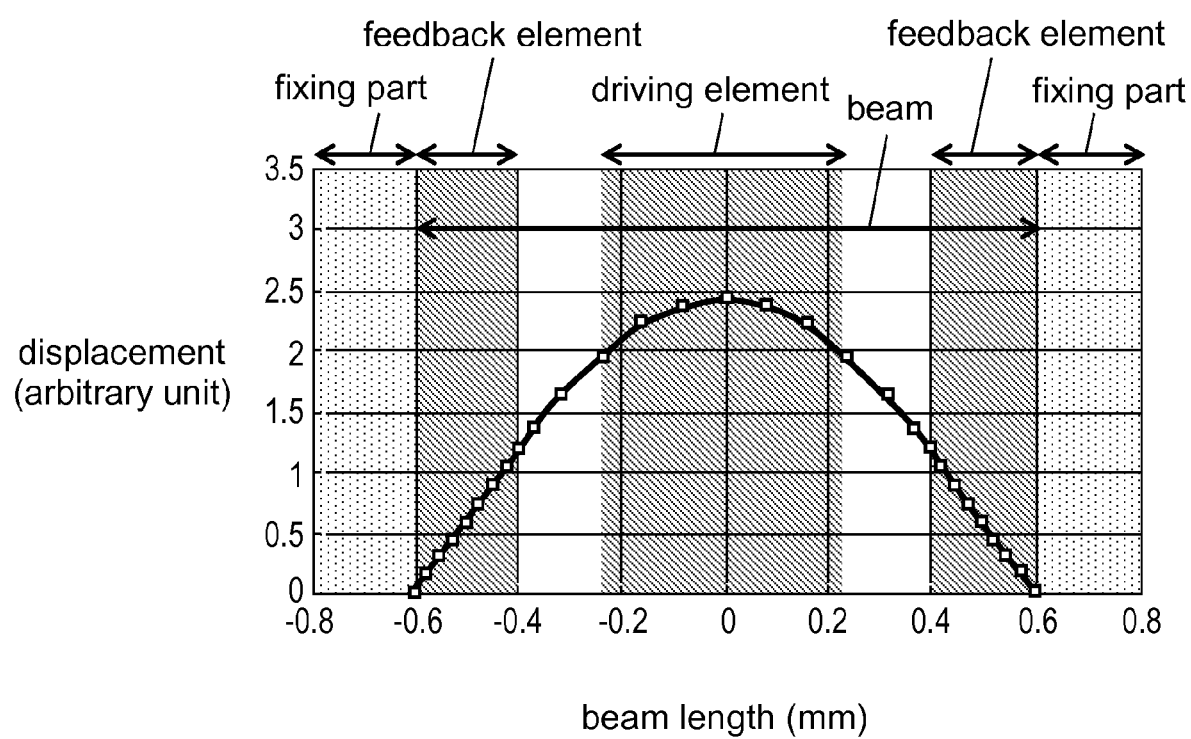
FIG. 2 illustrates results of simulating the distribution of vibration displacement of a beam of the physical quantity sensor in FIG. 1.

Driving element 24 is provided at the center of beam 22, and feedback elements 25 and 26 are provided on both ends of beam 22 at symmetrical positions relative to the center of beam 22. Therefore, a fundamental vibration mode in which vibration displacement is distributed symmetrically to the center of beam 22 is generated in beam 22. FIG. 2 shows results of simulating the distribution of vibration displacement when driving element 24 that is 3 μm thick and 0.45 mm long and feedback elements 25 and 26 that are 3 μm thick and 0.2 mm long are formed on beam 22 that is 10 μm thick and 1.2 mm long. It is also apparent from FIG. 2 that the fundamental vibration mode, in which the center is the antinode and both ends are nodes, is generated in beam 22, and vibration displacement is distributed symmetrically to the center of beam 22. The fundamental vibration mode that has this type of symmetrical distribution of vibration displacement has large Q factor indicating sharpness of resonance. The string vibration is thus retained at stable frequency. Accordingly, a physical quantity, such as a strain or load, acting on the flexure element can be reliably detected.

Second Exemplary Embodiment

Figure 3A:
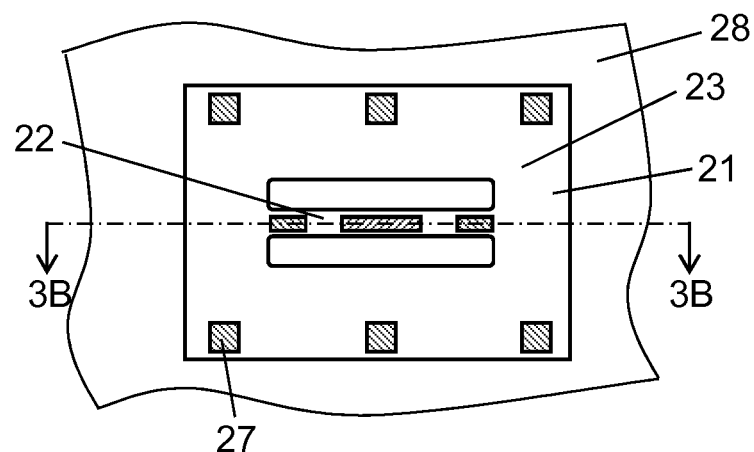
FIG. 3A is a top view of a physical quantity sensor in accordance with a second exemplary embodiment of the present invention.
Figure 3B:
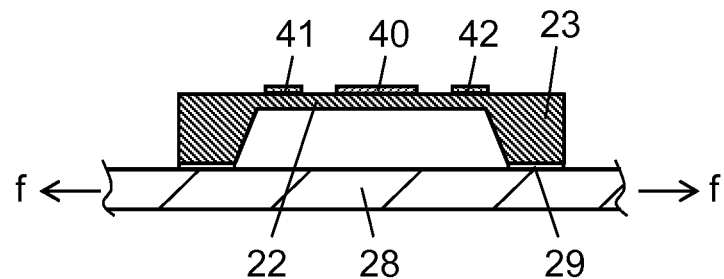
FIG. 3B is a sectional view taken along line 3B-3B in FIG. 3A.
Figure 3C:
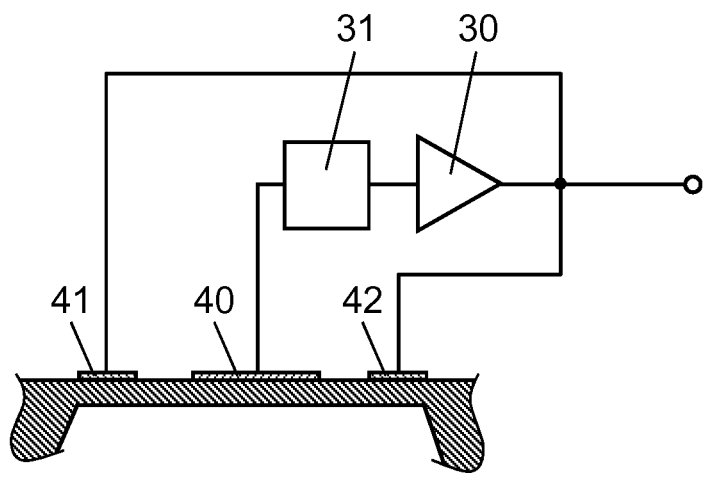
FIG. 3C illustrates an amplifier and a gain adjustment and phase shifting unit connected to the physical quantity sensor in FIG. 3B.

FIG. 3A is a top view of a physical quantity sensor in the second exemplary embodiment of the present invention. FIG. 3B is a sectional view taken along line 3B-3B in FIG. 3A. FIG. 3C illustrates an amplifier and a gain adjustment and phase shifting unit connected to the physical quantity sensor in FIG. 3B. In the second exemplary embodiment, same reference marks are given to components same as those in the first exemplary embodiment, and their description is omitted.

In FIGS. 3A to 3C, feedback element 40 (first piezoelectric element) is disposed on a central portion of beam 22. Feedback element 40 includes a lower electrode (not illustrated), a piezoelectric layer (not illustrated) typically made of PZT, and an upper electrode (not illustrated) in this sequence from the bottom. Driving elements 41 and 42 (second and third piezoelectric elements) are disposed on both ends of beam 22 at symmetrical positions relative to the center of beam 22. Each of driving elements 41 and 42 includes a lower electrode (not illustrated), a piezoelectric layer (not illustrated) typically made of PZT, and an upper electrode (not illustrated) in this sequence from the bottom. These points differ from the first exemplary embodiment in the second exemplary embodiment. In FIG. 3C, driving elements 41 and 42 are connected to an output side of amplifier 30. Feedback element 40 is connected to an input side of amplifier 30 via gain adjustment and phase shifting unit 31. Resonance frequencies of driving elements 41 and 42 and feedback element 40 are selected close to natural frequency $f_e$ of beam 22.

In the above configuration, amplifier 30 applies AC voltage with a frequency close to natural frequency $f_e$ of beam 22 to driving elements 41 and 42 provided at both ends of beam 22, with the same amplitude in the same phase. In response, driving elements 41 and 42 start stretching vibration in a direction parallel to a longer direction of beam 22. This stretching vibration causes beam 22 to start vertical string vibration at natural frequency $f_e$.

Feedback element 40 receives this string vibration, and then generates AC signals with frequency equivalent to natural frequency $f_e$ of beam 22. Gain adjustment and phase shifting unit 31 adjusts phases of these AC signals, and feeds back these signals to the input side of amplifier 30. Accordingly, beam 22 retains string vibration at a frequency equivalent to its natural frequency $f_e$.

In this state in which beam 22 is undergoing vertical string vibration, the tensile force on beam 22 increases if load f acting on flexure element 28 increases. Natural frequency $f_e$ of beam 22 therefore increases. Conversely, if load f acting on flexure element 28 decreases, the tensile force on beam 22 decreases, and natural frequency $f_e$ of beam 22 therefore decreases. Accordingly, a strain or load f acting on flexure element 28 can be measured by measuring natural frequency $f_e$ output to the terminal.

Here, feedback element 40 is provided at the center of beam 22, and driving elements 41 and 42 are provided on both ends of beam 22 at symmetrical positions relative to the center of beam 22. Therefore, the fundamental vibration mode in which vibration displacement is distributed symmetrically to the center of beam 22, same as that shown in FIG. 2, is generated in beam 22. The fundamental vibration mode that has this type of symmetrical distribution of vibration displacement has large Q factor indicating sharpness of resonance. The string vibration is thus retained at stable frequency. In addition, since feedback element 40 is disposed at a position where vibration amplitude is the highest that is, in the center of the vibrating body, output voltage from feedback element 40 can be increased. Accordingly, the second exemplary embodiment offers an effect of reliably detecting a physical quantity, such as a strain or load, acting on the flexure element.

Third Exemplary Embodiment

Figure 4A:
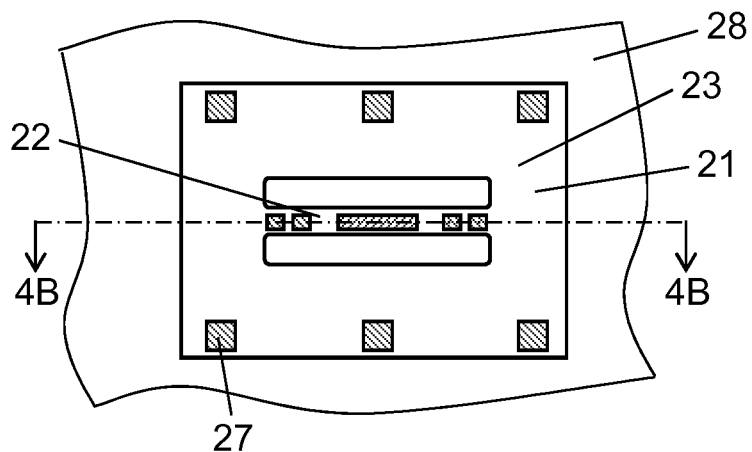
FIG. 4A is a top view of a physical quantity sensor in accordance with a third exemplary embodiment of the present invention.
Figure 4B:
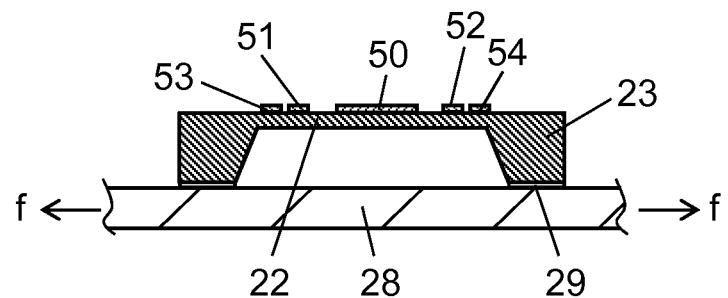
FIG. 4B is a sectional view taken along line 4B-4B in FIG. 4A.
Figure 4C:
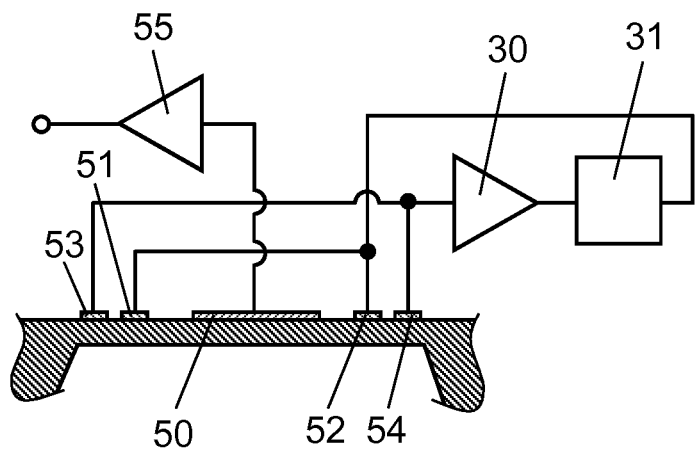
FIG. 4C illustrates an amplifier and a gain adjustment and phase shifting unit connected to the physical quantity sensor in FIG. 4B.
Figure 5A:
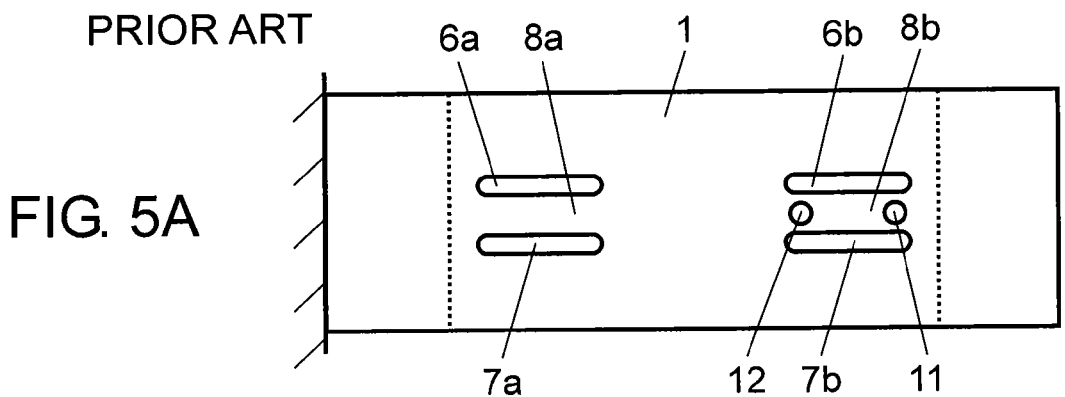
FIG. 5A is a top view of a conventional physical quantity sensor.
Figure 5B:
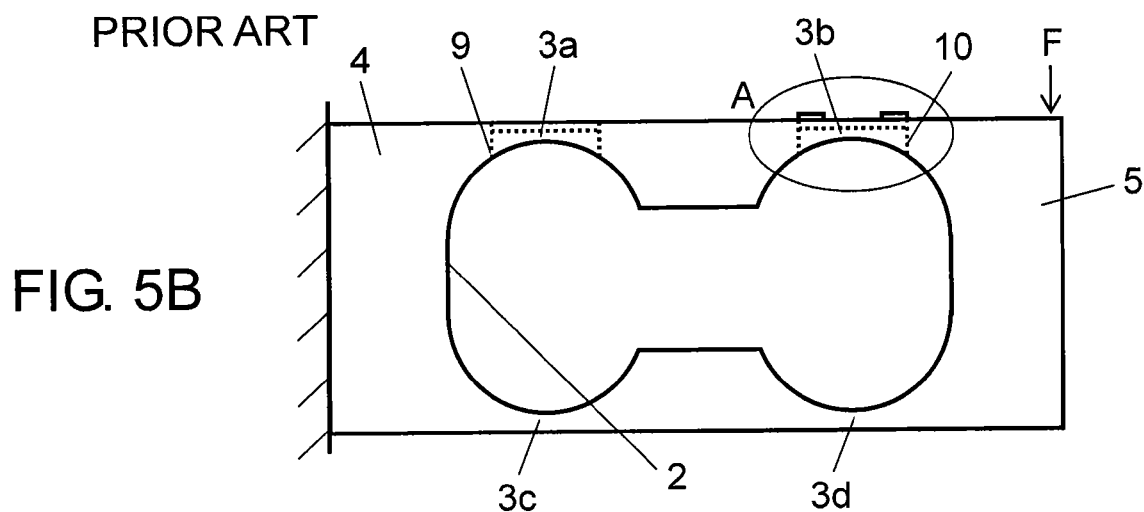
FIG. 5B is a side view of the conventional physical quantity sensor.
Figure 5C:
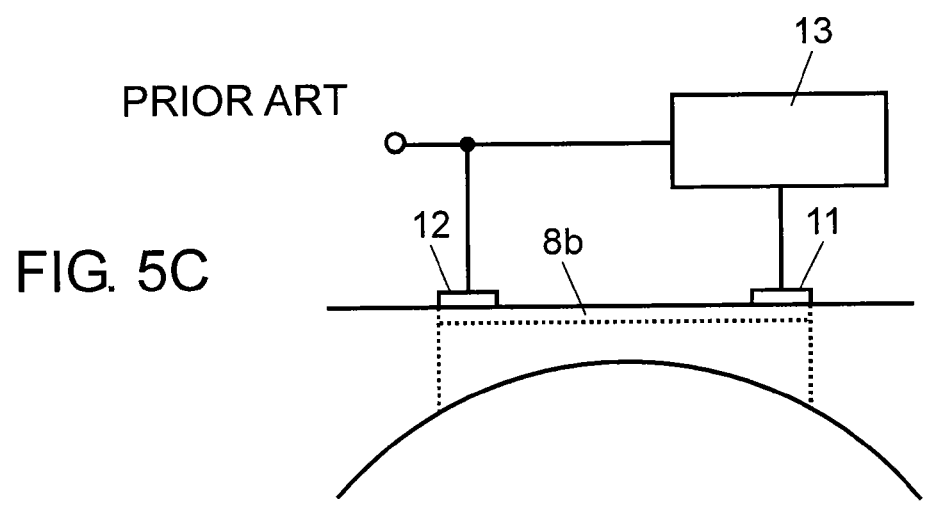
FIG. 5C is a side view of an essential part where an oscillator is connected to portion A in FIG. 5B.
Figure 6A:
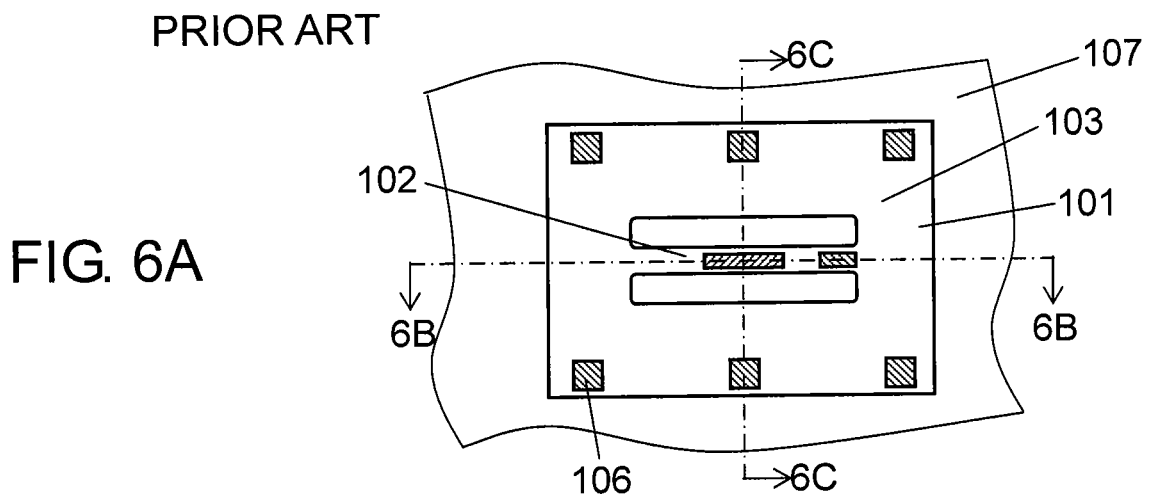
FIG. 6A is a top view of the conventional physical quantity sensor.
Figure 6B:
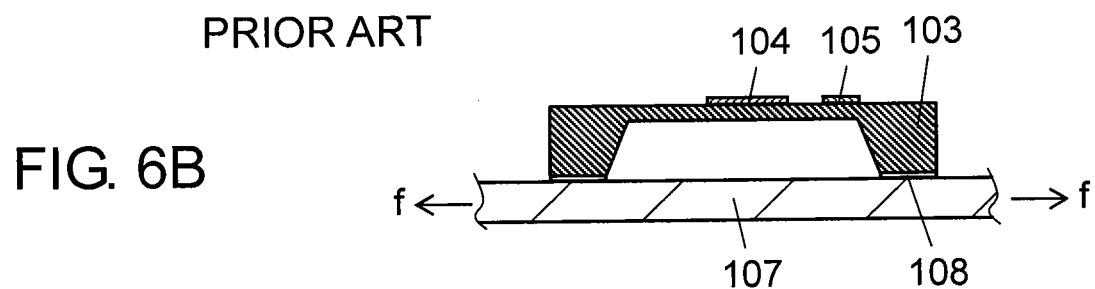
FIG. 6B is a sectional view taken along line 6B-6B in FIG. 6A.
Figure 6C:
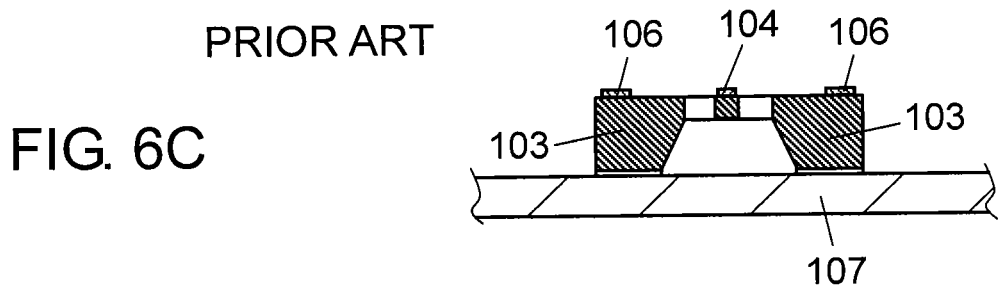
FIG. 6C is a sectional view taken along line 6C-6C in FIG. 6A.
Figure 7:
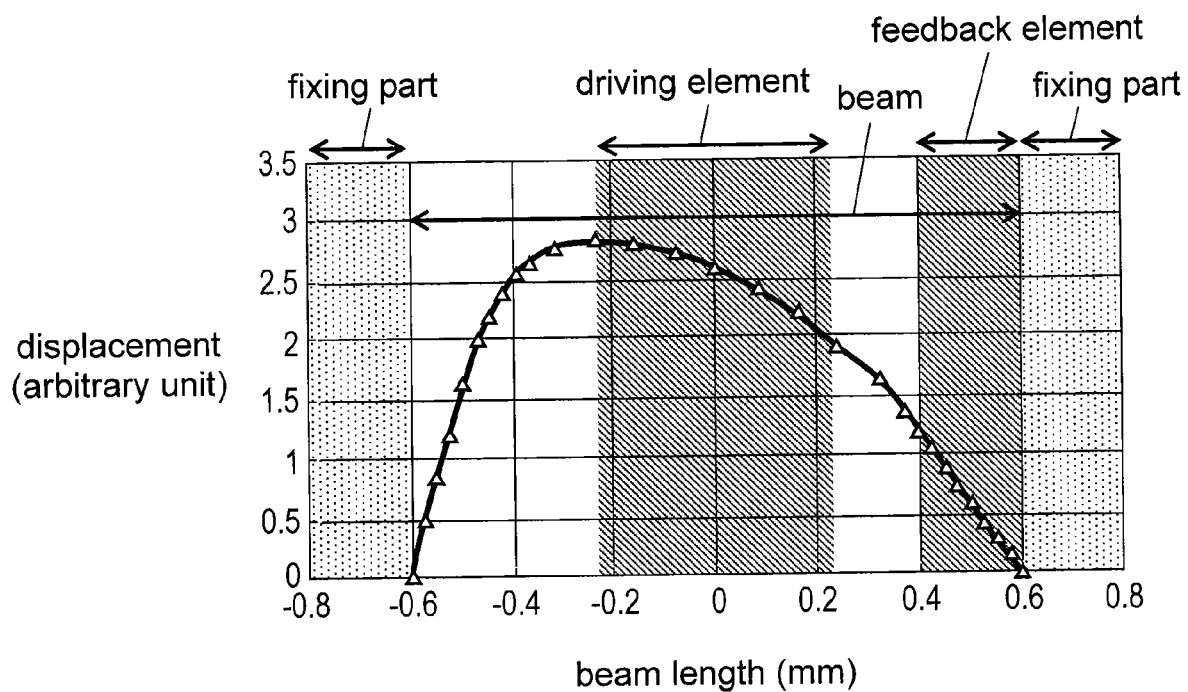
FIG. 7 illustrates results of simulating the distribution of vibration displacement of a beam of the conventional physical quantity sensor.

FIG. 4A is a top view of a physical quantity sensor in the third exemplary embodiment of the present invention. FIG. 4B is a sectional view taken along line 4B-4B in FIG. 4A. FIG. 4C illustrates an amplifier and a gain adjustment and phase shifting unit connected to the physical quantity sensor in FIG. 4B. In the third exemplary embodiment, same reference marks are given to components same as those in the first exemplary embodiment, and their description is omitted.

In FIGS. 4A to 4C, detecting element 50 (first piezoelectric element) is disposed on a central portion of beam 22. Detecting element 50 includes a lower electrode (not illustrated), a piezoelectric layer (not illustrated) typically made of PZT, and an upper electrode (not illustrated) in this sequence from the bottom. Driving elements 51 and 52 (second and third piezoelectric elements) are disposed on both ends of beam 22 at symmetrical positions relative to the center of beam 22. Each of driving elements 51 and 52 includes a lower electrode (not illustrated), a piezoelectric layer (not illustrated) typically made of PZT, and an upper electrode (not illustrated) in this sequence from the bottom. Feedback elements 53 and 54 (fourth and fifth piezoelectric elements) are disposed on both ends of beam 22 at symmetrical positions relative to the center of beam 22. Each of feedback elements 53 and 54 includes a lower electrode (not illustrated), a piezoelectric layer (not illustrated) typically made of PZT, and an upper electrode (not illustrated) in this sequence from the bottom. Feedback elements 53 and 54 (fourth and fifth piezoelectric elements) are disposed near driving elements 51 and 52, respectively. In FIG. 4C, feedback elements 53 and 54 are connected to an input side of first amplifier 30. An output signal from first amplifier 30 is applied to driving elements 51 and 52 via gain adjustment and phase shifting unit 31. AC signals obtained from detecting element 50 are output via second amplifier 55. Resonance frequencies of detecting element 50, driving elements 51 and 52, and feedback elements 53 and 54 are selected close to natural frequency $f_e$ of beam 22.

In the above configuration, first amplifier 30 applies AC voltage with a frequency close to natural frequency $f_e$ of beam 22 to driving elements 51 and 52 provided on both ends of beam 22, with the same amplitude in the same phase. This causes driving elements 51 and 52 to start stretching vibration in a direction parallel to a longer direction of beam 22. This stretching vibration causes beam 22 to start vertical string vibration at its natural frequency $f_e$. Feedback elements 53 and 54 provided near driving elements 51 and 52 receive this string vibration, and then generate AC signals with a frequency equivalent to natural frequency $f_e$ of beam 22. These AC signals are amplified in amplifier 30, and then fed back to the input side of first amplifier 30 via gain adjustment and phase shifting unit 31. Accordingly, beam 22 retains string vibration at frequency equivalent to its natural frequency $f_e$. Second amplifier 55 amplifies and outputs AC signals with frequency equivalent to natural frequency $f_e$ of beam 22 that is generated from detecting element 50.

In this state in which beam 22 is undergoing vertical string vibration, the tensile force on beam 22 increases if load f acting on flexure element 28 increases. Natural frequency $f_e$ of beam 22 therefore increases. Conversely, if load f on flexure element 28 decreases, the tensile force acting on beam 22 decreases, and natural frequency $f_e$ of beam 22 therefore decreases. Accordingly, a stress or load f acting on flexure element 28 can be measured by measuring natural frequency $f_e$ output to the terminal.

Detecting element 50 is provided at the center of beam 22, and driving elements 51 and 52 are provided on both ends of beam 22 at symmetrical positions relative to the center of beam 22. In addition, feedback elements 53 and 54 are disposed near driving elements 51 and 52, respectively, at symmetrical positions relative to the center of beam 22. By feeding back the vibration state of the vibrating body near the driving element and detecting this vibration state by the detecting element, the fundamental vibration mode, in which vibration displacement is distributed symmetrically to the center of the vibrating body, can be reliably generated. In addition, since detecting element 50 is disposed at a position where the vibration amplitude is the highest, that is, in the center of the vibrating body, output voltage from detecting element 50 can be increased. Accordingly, the third exemplary embodiment offers an effect of further reliably detecting a physical quantity, such as a strain or load, acting on the flexure element.

INDUSTRIAL APPLICABILITY

A physical quantity sensor of the present invention can generate a fundamental vibration mode in which vibration displacement is distributed symmetrically to the center of the beam-like vibrating body. Accordingly, the present invention has an effect of reliably detecting a strain or load acting on an object. In particular, the present invention is effectively used as a physical quantity sensor for detecting a strain or load acting on an object.

REFERENCE MARKS IN THE DRAWINGS

21 Semiconductor Substrate
22 Beam (beam-like vibrating body)
23 Fixing Part
24 Driving Element
25, 26 Feedback Element
28 Flexure Element
29 Rigid Substance
30 Amplifier
31 Gain Adjustment and Phase Shifting Unit
40 Feedback Element
41, 42 Driving Element
50 Detecting Element
51, 52 Driving Element
53, 54 Feedback Element

The invention claimed is:

1. A physical quantity sensor comprising:
a beam-like vibrating body;
a fixing part supporting both ends of the vibrating body;
a first piezoelectric element formed on a central portion of the vibrating body;
a second piezoelectric element formed on one end of the vibrating body; and
a third piezoelectric element formed on an other end of the vibrating body, wherein
at least the vibrating body has a first surface and a second surface opposite to the first surface; and
the first piezoelectric element, the second piezoelectric element and the third piezoelectric element are on the first surface.

2. The physical quantity sensor of claim 1, wherein
the second piezoelectric element and the third piezoelectric element are formed at symmetrical positions relative to a center of the vibrating body.

3. The physical quantity sensor of claim 1, wherein
the first piezoelectric element acts as a driving element; and
the second piezoelectric element and the third piezoelectric element act as feedback elements.

4. The physical quantity sensor of claim 1, wherein
the first piezoelectric element acts as a feedback element; and
the second piezoelectric element and the third piezoelectric element act as driving elements.

5. The physical quantity sensor of claim 1, wherein
a physical quantity acting on the vibrating body can be detected by causing natural vibration in the vibrating body and measuring a natural frequency of the vibrating body.

6. The physical quantity sensor of claim 1, wherein
the vibrating body has a first end and a second end and the fixing part supports the first end and the second end.

7. The quantity sensor of claim 6, wherein
the second piezoelectric element is formed on the first end; and
the third piezoelectric element is formed on the second end.

8. The physical quantity sensor of claim 1, wherein the first surface is planar.

9. A physical quantity sensor comprising:
a beam-like vibrating body;
a fixing part supporting both ends of the vibrating body;
a first piezoelectric element formed on a central portion of the vibrating body;
a second piezoelectric element formed on one end of the vibrating body;
a third piezoelectric element formed on an other end of the vibrating body;
a fourth piezoelectric element formed near the second piezoelectric element; and
a fifth piezoelectric element formed near the third piezoelectric element,
wherein
at least the vibrating body has a first surface and a second surface opposite to the first surface; and
the first piezoelectric element, the second piezoelectric element and the third piezoelectric element are on the first surface.

10. The physical quantity sensor of claim 9, wherein
the fourth piezoelectric element and the fifth piezoelectric element are formed at symmetrical positions relative to a center of the vibrating body.

11. The physical quantity sensor of claim 9, wherein
the second piezoelectric element and the third piezoelectric element are formed at symmetrical positions relative to a center of the vibrating body.

12. The physical quantity sensor of claim 9, wherein
the first piezoelectric element acts as a detecting element;
the second piezoelectric element and the third piezoelectric element act as driving elements; and
the fourth piezoelectric element and the fifth piezoelectric element act as feedback elements.

13. The physical quantity sensor of claim 9, wherein
a physical quantity acting on the vibrating body is detected by causing natural vibration in the vibrating body by driving the second piezoelectric element and the third piezoelectric element with a same amplitude in a same phase;
feeding back a vibration state by the fourth piezoelectric element and the fifth piezoelectric element; and
detecting a natural frequency of the vibrating body by the first piezoelectric element.

14. The physical quantity sensor of claim 9, wherein
the vibrating body has a first end and a second end; and
the fixing part supports the first end and the second end.

15. The quantity sensor of claim 14, wherein
the second piezoelectric element is formed on the first end; and
the third piezoelectric element is formed on the second end.

* * * * *